US006535377B2

(12) United States Patent
Carteau et al.

(10) Patent No.: US 6,535,377 B2
(45) Date of Patent: Mar. 18, 2003

(54) POWER DISTRIBUTION UNIT FOR ELECTRICAL DEVICES

(75) Inventors: Daniel Carteau, Montigny le Bretonneux (FR); Alain Leparoux, Angers (FR)

(73) Assignee: Bull S.A., Louveciennes (FR)

( * ) Notice: Subject to any disclaimer, the term of this patent is extended or adjusted under 35 U.S.C. 154(b) by 0 days.

(21) Appl. No.: 09/818,650

(22) Filed: Mar. 28, 2001

(65) Prior Publication Data
US 2002/0057543 A1 May 16, 2002

(30) Foreign Application Priority Data
Mar. 28, 2000 (FR) .............................. 00 03915

(51) Int. Cl.$^7$ ......................... H01H 71/10; H01H 3/00; H01H 71/58; H02B 1/30; H02B 1/04
(52) U.S. Cl. ......................... 361/632; 200/330; 337/56; 361/64; 361/679; 361/724
(58) Field of Search ................................ 200/17 R, 18, 200/61.5, 329–339, 1 R–16 F; 335/166; 337/56, 91, 72, 130, 155, 348, 358, 367, 145, 146, 338, 340, 87; 361/115, 64, 600, 627, 628, 631, 632, 634, 673, 679, 724, 728, 837

(56) References Cited
U.S. PATENT DOCUMENTS

| 3,142,732 A | * | 7/1964 | Clarke et al. ................ 200/50 |
| 3,187,120 A | * | 6/1965 | Akst .......................... 200/16 E |
| 3,294,926 A | * | 12/1966 | Dellert et al. .................. 200/5 |
| 3,867,598 A | * | 2/1975 | Richards et al. ......... 200/337 X |
| 4,011,423 A | | 3/1977 | Zepp |
| 4,524,338 A | * | 6/1985 | Cotton .......................... 335/8 |
| 4,544,815 A | * | 10/1985 | Portmann ................ 200/50.32 |
| 4,692,570 A | * | 9/1987 | Barlian et al. ................ 200/4 |
| 4,788,453 A | * | 11/1988 | Bohnen et al. ............. 307/119 |
| 4,812,793 A | * | 3/1989 | Krasij ........................... 335/8 |
| 5,153,551 A | | 10/1992 | Fournier et al. |
| 5,712,515 A | | 1/1998 | Kenji et al. |

* cited by examiner

Primary Examiner—J. R. Scott
(74) Attorney, Agent, or Firm—Edward J. Kondracki; Miles & Stockbridge P.C.

(57) ABSTRACT

A power distribution unit (PDU) for supplying power to at least one electrical device (APP1–APP12), comprises at least one distribution point (P) for the power supply, and at least one female outlet (J1–J12) on its accessible side. The outlet is adapted to receive a male connector of a cable of an electrical device (APP1–APP12). The point (P) is electrically connected by a respective electrical cable to at least one manually resettable circuit breaker (BRK1–BKR6). The at least one circuit breaker comprises a respective push button (POU1–POU6) for resetting the circuit breaker. The circuit breaker (BRK1–BRK6) is connected by a respective electrical cable to the at least one female outlet (J1–J12). The circuit breaker (BRK1–BRK6) is located inside the unit and at least one reset mechanism capable of resetting the at least one circuit breaker is provided. Several circuit breakers may be supported in line and the reset mechanism is capable of resetting all of the circuit breakers simultaneously. The push button may be responsive to the condition of the circuit breaker with an end extending beyond the wall for the distribution power unit so as to provide a visual indication that an electrical failure has occurred in one of the electrical devices.

15 Claims, 9 Drawing Sheets

POWER DISTRIBUTION UNIT FOR ELECTRICAL DEVICES

FIELD OF THE INVENTION

The invention relates to a power distribution unit capable of distributing a power supply to multiple electrical devices. The invention applies to any system requiring the distribution of alternating or direct current power supplies. The invention applies, for example, to a cabinet for a computer data storage unit incorporating mass storage subsystems, network elements of the SAN (Storage Area Network) type such as concentrators, switches, etc. The invention particularly applies to computer cabinets wherein the mass storage subsystems comprise disks that store data using RAID (Redundant Array of Independent Disks) technology or JBOD (Just a Bunch of Disks) technology, both of which are known to one skilled in the art.

Hereinafter, the expression "electrical devices" will be used in place of the expression "mass storage subsystems and network elements."

DESCRIPTION OF RELATED ART

Generally, a power distribution unit comprises at least one distribution point for the power supply, and at least one female outlet on its side designed to receive a male connector of a cable of an electrical device, at least one circuit breaker comprising a respective push button for resetting it. The distribution point is electrically connected by means of a respective electrical cable to a manually resettable circuit breaker. A circuit breaker is connected by means of an electrical cable to at least one female outlet.

In the example chosen, the computer cabinet has a parallelepipedic shape with four vertical sides and two horizontal sides.

This cabinet has two openings on its vertical sides:

A first opening, constituting the front side of the cabinet, allows a user to use the volume of the cabinet by inserting electrical devices into it. The electrical cables of each device are accessible on the rear side, which constitutes the second opening defined below.

A second opening, located on the side of the cabinet opposite the first opening. This second opening constitutes the rear side of the cabinet and allows a user to insert the distribution unit, and in particular, to electrically connect the electrical devices to the distribution unit by means of respective electrical cables. The accessible side of the distribution unit is located on this rear side of the cabinet.

The electrical connections of the electrical devices of the cabinet to the distribution unit are made on the accessible side of the distribution unit. For this reason, on its accessible side, the distribution unit must comprise as many female outlets as there are electrical devices to be supplied with power in the cabinet.

A distribution unit also comprises manually resettable circuit breakers, thus providing protection against possible failures in any electrical device in the cabinet. Generally, each circuit breaker is disposed on the accessible side of the distribution unit near the female outlet associated with it.

Let us recall that a failure may be due to an overload or a short circuit in any device in the cabinet.

The distribution unit must therefore comprise, on its accessible side, as many female outlets and circuit breakers as there are electrical devices to be supplied with power in the cabinet.

A simplistic solution could consist of building units of such size that the accessible side can receive as many female outlets and circuit breakers as there are electrical devices to be supplied with power in the cabinet.

The big problem is that, in order to encourage the opening of markets while ensuring the compatibility and interoperability of computer cabinets with one another, the structure of a computer cabinet and the associated electrical devices must be designed in accordance with precise standards.

In the present case, the distribution unit must be designed in accordance with the EIA 19-inch standard (1 inch=2.54 cm) and must have a height of 1 U (~44 mm).

In concrete terms, the computer cabinet chosen as an exemplary illustration in the description below comprises 12 electrical devices. The distribution unit therefore requires on its accessible side:

- 12 standardized outlets on its side that is accessible by a user,
- the same number of protective thermal circuit breakers (with their potential break point visible),
- a maximum total current capacity of 24 Amperes,
- and the outlet for the main power cable of the cabinet.

It is physically impossible, for space reasons, to accommodate a cable outlet, 12 female power supply outlets and the associated circuit breakers on the accessible side of a 1U distribution unit.

SUMMARY OF THE INVENTION

The object of the invention is to solve this problem by providing a distribution unit of simple and economical design that is easy and safe to use.

To this end, the subject of the invention is a power distribution unit for supplying power to at least one electrical device, comprising at least one distribution point for the power supply, and at least one female outlet on its side designed to receive a male connector of a cable of an electrical device, said point being electrically connected by means of a respective electrical cable to at least one manually resettable circuit breaker, said at least one circuit breaker comprising a respective push button for resetting it, a circuit breaker being connected by means of a respective electrical cable to at least one female outlet, characterized in that said at least one circuit breaker is located inside the unit, and in that it comprises at least one reset mechanism capable of resetting said at least one circuit breaker.

According to a preferred embodiment of the invention, the reset mechanism comprises two parts:

- a first mechanical part that fastens said at least one circuit breaker (BRK1–BRK6) to the inside of the unit,
- a second part comprising at least one reset mechanism (RM) capable of resetting said at least one circuit breaker remotely. To this end, in our exemplary embodiment, the reset mechanism is associated with a control means whose function is to control the movement of the reset mechanism (RM) associated with it inside the unit.

According to this embodiment, the second part comprises a push pin connected at one of its ends to the reset mechanism, its other end extending outside the unit through an opening provided on the accessible side of the unit.

The choice of the reset mechanism is a function of the choice of the type of circuit breaker used.

Advantageously, the reset mechanism is held apart from the push button of said at least one circuit breaker by means of at least one spring, and the resetting of said at least one circuit breaker is achieved by compressing said at least one spring until the push button of said at least one circuit breaker is depressed and resets the circuit breaker.

Certain circuit breakers have a push button that shows through its state (in or out) whether a break has occurred (out) and that allows reactivation by pressing on the push button. Advantageously, this type of circuit breaker allows the spring of the circuit breaker to eject the push button in case of electrical failure. The push button drives the reset mechanism, the push pin TP and the push button BP in its movement, the displacement of the push button BP on the accessible side of the unit indicating that an electrical failure has occurred in the cabinet ARM.

Preferably, a circuit breaker protects a respective electrical device in the cabinet, and each circuit breaker is associated with a reset mechanism so as to identify the electrical device in which the failure has occurred.

In our exemplary embodiment, the unit comprises several circuit breakers and the reset mechanism RM covers all of the circuit breakers (BRK1–BRK6), thus making it possible to reset all of the circuit breakers included in the unit simultaneously.

The reset mechanism can cover all of the circuit breakers and reset all of the circuit breakers included in the unit simultaneously.

A corollary subject of the invention is a method for resetting at least one manually resettable circuit breaker included in a power distribution unit, said unit comprising at least one distribution point for the power supply, and at least one female outlet on its side designed to receive a respective male connector of an electrical device, said point being electrically connected by means of a respective electrical cable to said at least one circuit breaker, said at least one circuit breaker comprising a respective push button for resetting it, a circuit breaker being connected by means of a respective electrical cable to at least one female outlet, characterized in that it consists of placing said at least one circuit breaker inside the unit, and in that if at least one circuit breaker trips, it consists of resetting said at least one circuit breaker remotely.

In our exemplary embodiment, the remote reset consists of using at least two mechanical parts, a first part that fastens said at least one circuit breaker into the unit, a second part having the function of moving inside the unit so as to reset said at least one circuit breaker remotely.

The method consists, for example, of equipping the second part with a reset mechanism, whose surface covers at least said push button of said at least one circuit breaker, and in that it consists of moving this reset mechanism by means of a push pin wherein one of the ends is attached to the reset mechanism and the other end extends outside the unit.

On the whole, the location of the circuit breakers inside the unit and the capability to reset the circuit breakers remotely provides many advantages.

A first advantage is an increase in space on the accessible side of the distribution unit; the invention thus makes it possible to increase the power distribution capacity of the distribution unit, i.e., to increase the number of power supply outlets it can contain for supplying power to the electrical devices in a cabinet.

A second advantage is that the cabinet maintains optimal electrical protection against potential failures in the cabinet.

The invention also has the big advantage of providing only one access on the accessible side of the unit in order to facilitate maintenance and safety.

Another non-negligible advantage is that the distribution unit is easy to use.

Another advantage is that the distribution unit is easy to install, which saves time during its installation.

This results in a computer cabinet comprising at least one power distribution unit for supplying power to at least one electrical device included in the cabinet, said unit comprising at least one distribution point P for the power supply, and at least one female outlet on its side designed to receive a male connector of a respective electrical device, said point being electrically connected by means of a respective electrical cable to at least one manually resettable circuit breaker, said at least one circuit breaker comprising a respective push button for resetting it, a circuit breaker being connected by means of a respective electrical cable to at least one female outlet, characterized in that the unit is the one described above.

BRIEF DESCRIPTION OF THE DRAWINGS

The invention will be more clearly understood by reading the following description given as an example and written in reference to the attached drawings.

In the drawings:

FIG. 5A is a view of the reset mechanism in the rest state; FIG. 5B is a view of the reset mechanism as it resets the circuit breakers through manual pressure on the push button on the outside of the distribution unit.

FIG. 6A is a view of the reset mechanism in the rest state; FIG. 6B is a view of the reset mechanism indicating that a failure has occurred in an electrical device.

FIG. 7B illustrates the mechanism in the rest state. FIG. 7C illustrates the state of the reset mechanism that indicates that a failure has occurred in the cabinet. FIG. 7D illustrates the state of the mechanism after a circuit break.

In order to simplify the description, the same elements in the drawings have the same references.

DETAILED DESCRIPTION OF THE PREFERRED EMBODIMENT(S)

Figure 1:
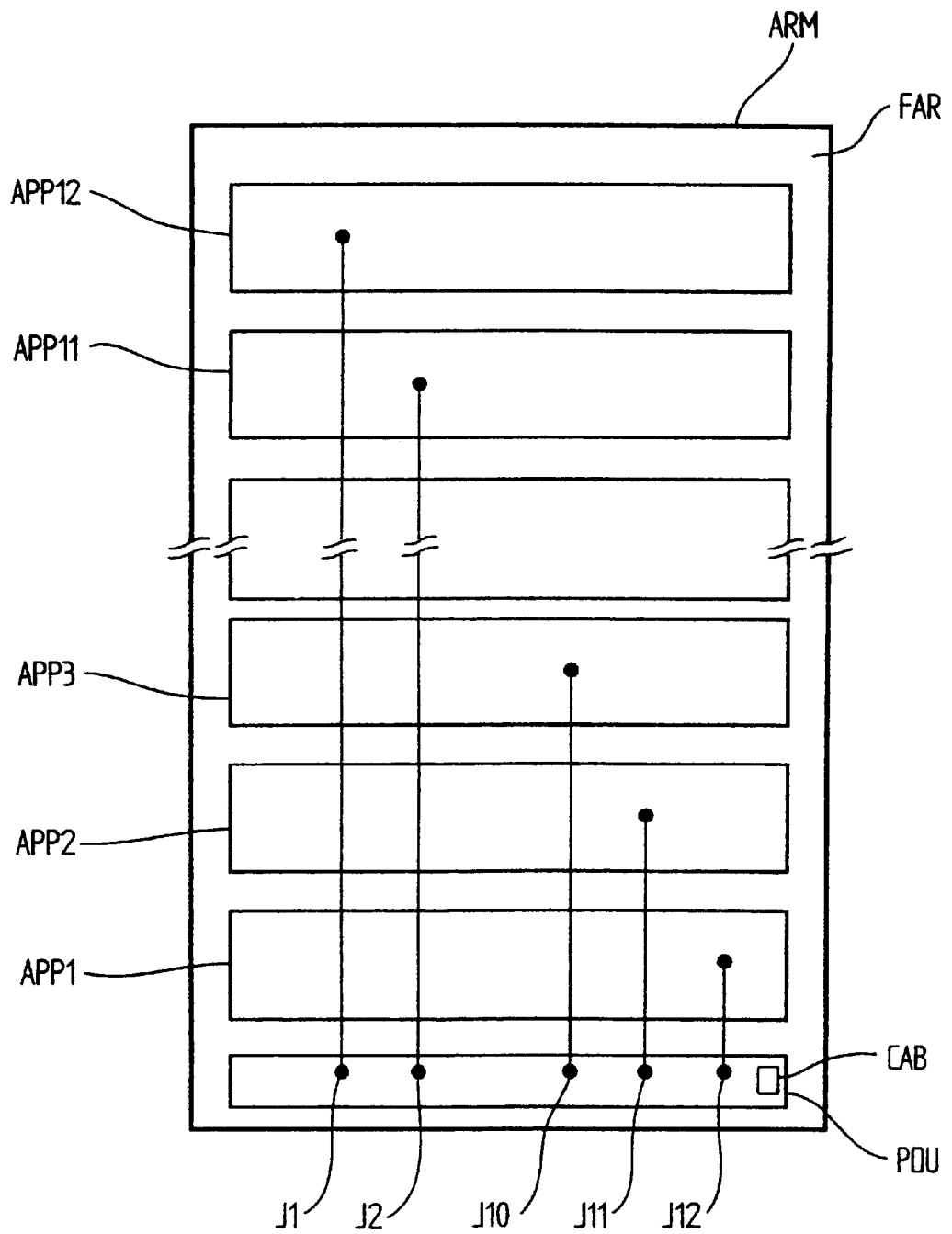
FIG. 1 is a highly schematic elevation of the opening constituting the rear side of a computer cabinet, showing the accessible side of the distribution unit and the electrical devices to be supplied with power.

FIG. 1 represents an exemplary cabinet ARM in which the present invention can be implemented.

In the example chosen, this cabinet ARM has a parallelepipedic shape with four vertical sides and two horizontal sides. Two of the four vertical sides comprise an opening that provides access to the inside of the cabinet. A first opening, not represented, constitutes the front side of the cabinet, and allows a user to use the volume of the cabinet by inserting electrical devices into it.

A second opening FAR located on the side of the cabinet opposite the first opening. This second opening constitutes the rear side of the cabinet. The electrical cable of each apparatus is accessible on this rear side.

The inside of the cabinet ARM comprises at least one electrical device APP1–APP12 to be supplied with power.

The inside of the cabinet also comprises at least one distribution unit PDU. If the disks included in the mass storage subsystems are configured according to RAID or JBOD technology, the cabinet comprises two distribution units PDU, providing a redundancy of the power supply in the cabinet. In fact, in this configuration, for redundancy purposes, each device has two power supply cables.

Preferably, the devices APP1–APP12 and the unit PDU have a parallelepipedic shape and can be inserted into or removed from the cabinet ARM in the form of a drawer. Once inserted into the cabinet, the devices APP1–APP12 and the unit PDU each have one side that remains accessible on one side of the cabinet.

The unit PDU comprises, on its accessible side, an incoming cable CAB that provides a power supply. In the example illustrated, this cable comprises a phase line, a neutral line and a ground connected to a ground terminal in order to guarantee protection against electric shocks and voltage surges. The unit PDU also comprises, on its accessible side, at least one female outlet J1–J12 designed to receive a male connector of the cable of the respective device APP1–APP12 included in the cabinet.

Figure 2:
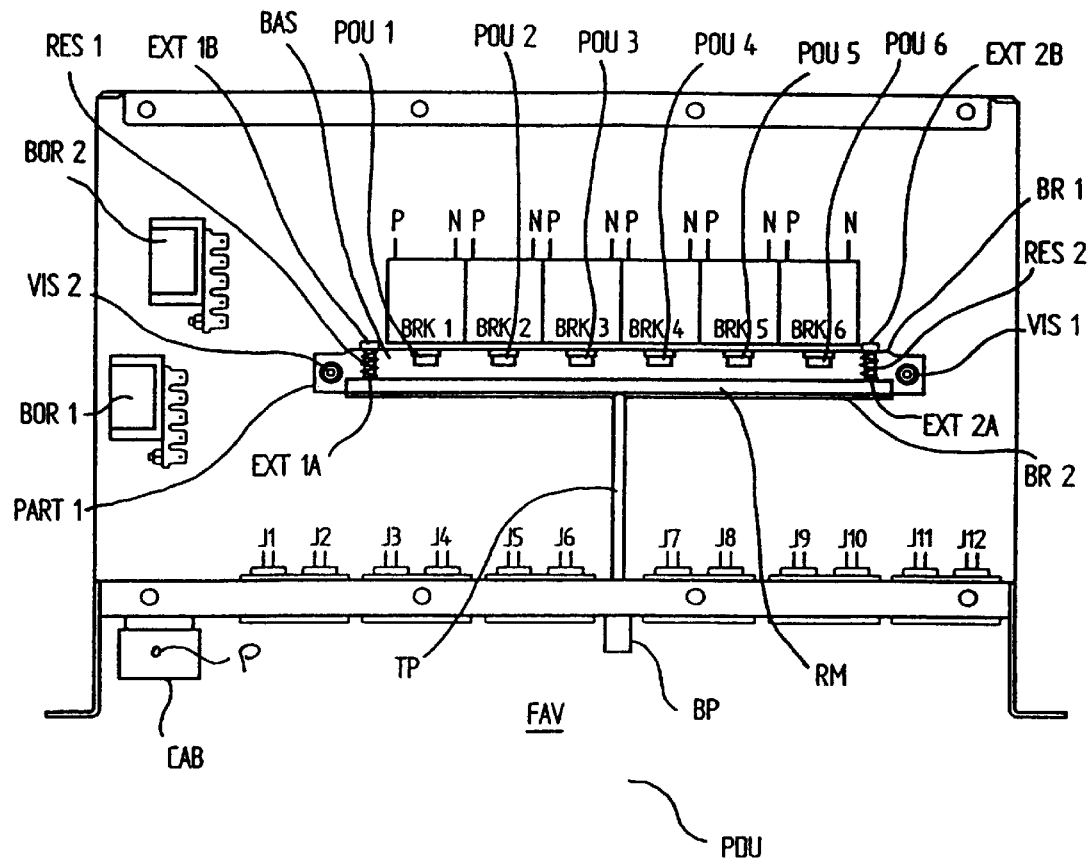
FIG. 2 is a top view of the distribution unit showing an exemplary embodiment of the present invention.

FIG. 2 illustrates an exemplary embodiment of a power distribution unit PDU.

Preferably, the power supply is distributed by means of at least one terminal block BOR1 and BOR2 located inside the unit. In the example illustrated, the terminal block BOR1 distributes the phase and the terminal block BOR2 distributes the neutral. In concrete terms, the terminal block receives the neutral line and distributes it to at least one female outlet (J1–J12) via a respective circuit breaker (BRK1–BRK6).

It is noted that the circuit breakers (BRK1–BRK6) chosen protect both the phase line and the neutral line (double circuit breakers), this characteristic being required for use in the US and Canada (international standards).

The circuit breakers are manually resettable. In the example illustrated, a circuit breaker is a resettable protective thermal circuit breaker known to one skilled in the art. This type of circuit breaker comprises a push button POU1–POU6 that includes a spring SP (FIGS. 5A and 5B) with a stiffness coefficient. If a circuit breaker trips, one need only apply enough force to the push button and the circuit breaker can be reset manually. One need only push it with a finger in order to reset it (provided, of course, that the cause that produced the excess current has disappeared; if this is not the case, it is impossible to reset it).

The cost price of a power distribution product being heavily impacted by the price and the type of the circuit breakers (the most expensive components in the assembly), it was decided to protect the outlets in pairs. In the example illustrated, the female outlets J1–J12 are therefore connected to one another in pairs in order to limit the number of power lines inside the unit.

Thus, one circuit breaker is enough to protect two female outlets. More precisely, the six circuit breakers BRK1–BRK6 are used to protect the six respective pairs of power supply outlets (J1–J2), (J3–J4), (J5–J6), (J7–J8), (J9–J10), (J11–J12).

Figure 3:
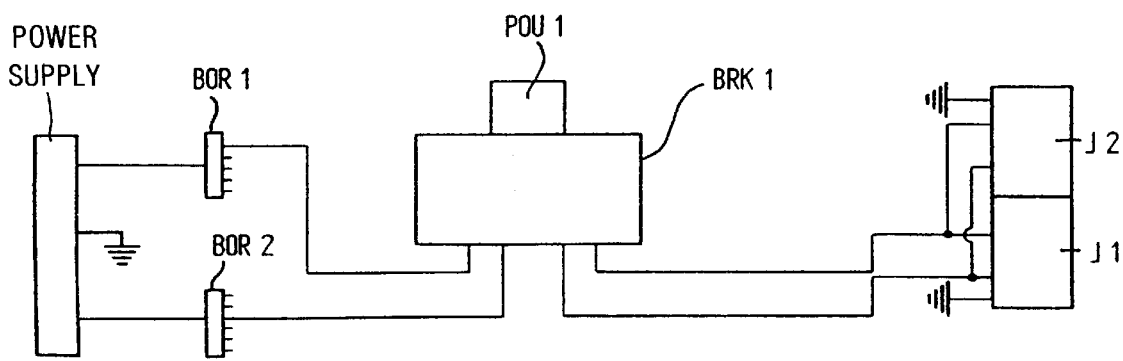
FIG. 3 is a highly schematic view of part of the wiring of a pair of outlets and of a circuit breaker inside the distribution unit shown in FIG. 2.

FIG. 3 is a wiring diagram illustrating an exemplary embodiment of the wiring inside the distribution unit PDU. This figure does not take into account the layout of the circuit breakers with respect to the terminal blocks and the female outlets. In order to make the drawing in the figure clear, only the wiring with the circuit breaker BK1 is represented, the wiring with the other five circuit breakers BRK2–BRK6 being identical.

In the example illustrated, the unit comprises: the wiring for the distribution of the power arriving through the external cable CAB and for its distribution to the 6 circuit breakers (BRK1–BRK6) through the terminal blocks BOR1 and BOR2, the wiring of each circuit breaker (BRK1–BRK6) to its pair of respective power supply outlets (J1–J2), (J3–J4), (J5–J6), (J7–J8), (J9–J10), (J11–J12).

and the wiring of the ground of the power supply and of the female outlets J1–J12.

The big problem is that the number of female outlets and circuit breakers is limited on the accessible side of the distribution unit. Consequently, the number of devices to be supplied with power in a cabinet is limited.

For this reason, the unit according to the invention is characterized in that all of the circuit breakers BRK1–BRK6 are located inside the unit PDU, and in that it comprises at least one reset mechanism capable of resetting all or some of the circuit breakers.

Figure 4:
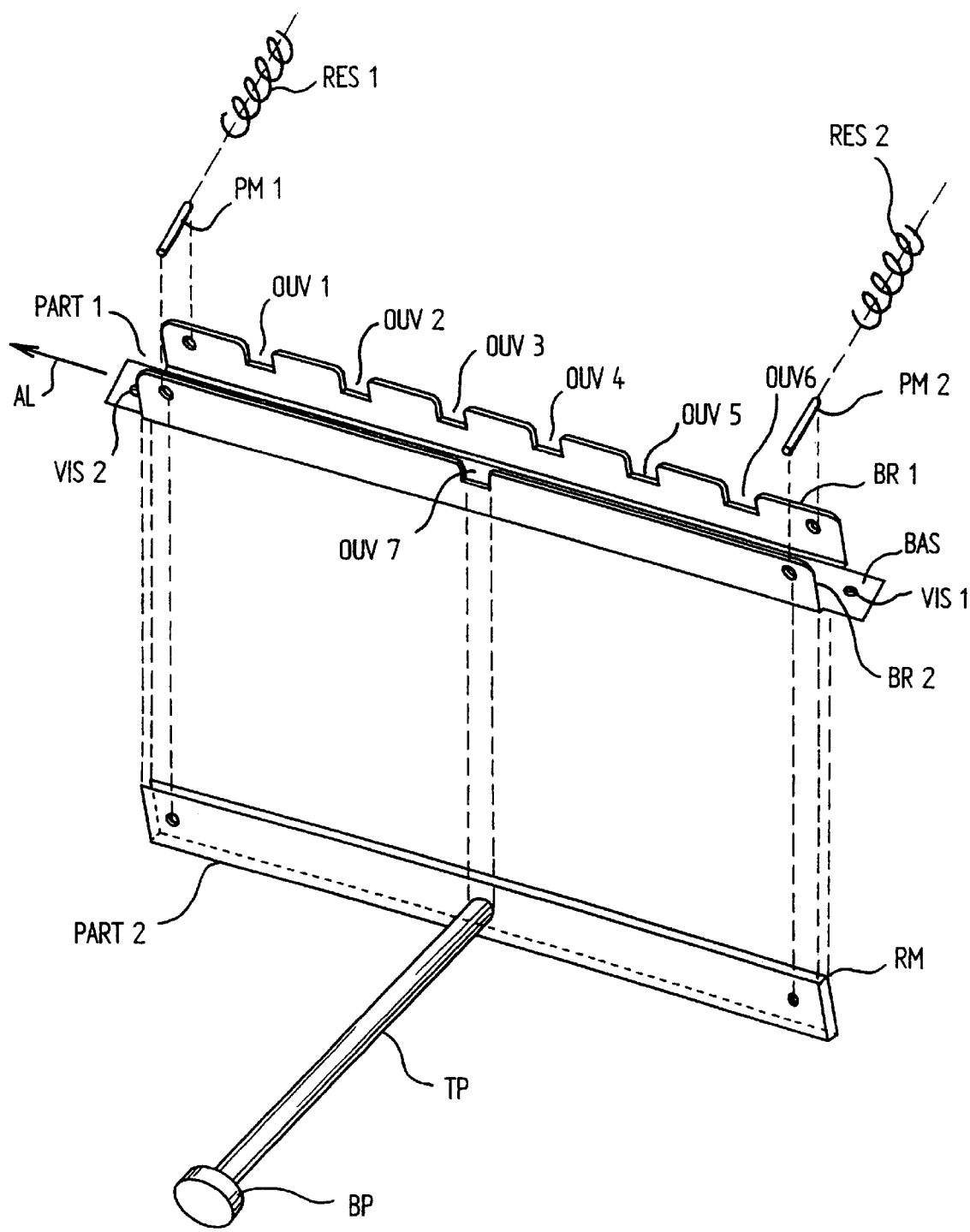
FIG. 4 is an exploded view in perspective of the reset mechanism shown in FIG. 2.

FIG. 4 is an exploded view in perspective of the reset mechanism shown in FIG. 2.

In the example illustrated, the reset mechanism comprises two mechanical parts:

the first mechanical part PART1 is a support whose specific function is to receive the circuit breakers. This support has a U-shaped cross section with a base BAS that is fastened, on a longitudinal axis AL, by means of screws VIS1 and VIS2 to one of the horizontal sides of the unit. This support comprises two sides BR1 and BR2 perpendicular to the base BAS. A first side comprises openings OUV1–OUV6, for example notches, whose function is to receive the push button POU1–POU6 of each respective circuit breaker BRK1–BRK6. The side BR1 ensures the alignment of the push buttons POU1–POU6 with the set of circuit breakers. It is assumed that this side is thin enough for each push button POU1–POU6, or part of each push button, of each respective circuit breaker BRK1–BRK6, to be inside the support.

The second side BR2 comprises, in the example illustrated, an opening OUV7 in its middle. This opening can be a notch. This opening is capable of receiving the second mechanical part of the reset mechanism.

The second mechanical part PART2 comprises a reset mechanism RM with a flat surface, whose surface can cover at least the set of push buttons of the circuit breakers BRK1–BRK6, a push pin TP, and a push button BP.

The push pin connects the reset mechanism and the push button and constitutes an integral mechanical assembly. Preferably, the reset mechanism RM is perpendicular to the push pin TP. The reset mechanism is installed along the longitudinal axis, in the empty part of the support. Preferably, the plane constituted by the reset mechanism is parallel to the planes constituted by the sides BR1 and BR2. The push pin emerges from the unit through an opening provided on the accessible side of this unit. In the example illustrated, this last opening is located between two pairs of female electrical outlets.

The reset mechanism RM can move inside the empty part between the two sides of the support. This movement is produced by exerting a force on the push button BP outside the unit PDU.

The movement of the reset mechanism RM takes place along a transverse axis. In order to consolidate the assembly of the two mechanical parts PART1 and PART2 and to allow a transverse movement of the second mechanical part, the latter is guided in its movement by means of at least one metal piece PM1 and PM2 attached to the support along a transverse axis. More precisely, one end of the piece PM1 is attached to a first side of the support and the other end is attached to the other side of the support. Holes are provided at the ends of the reset mechanism RM so that the reset mechanism is guided by the respective pieces PM1 and PM2.

The mechanism comprises respective springs RES1 and RES2, wherein one of the respective ends EXT1A and EXT2A is integral with the reset mechanism RM and the other respective end EXT1B and EXT2B is integral with the side BR1. Preferably, the springs RES1 and RES2 have an identical stiffness coefficient equal to K1. Likewise, the springs SP integrated into the push button of the circuit breakers BRK1–BRK6 all have the same stiffness coefficient K2.

In the example illustrated, in order to ensure the proper functioning of the springs, the transverse axis of the springs RES1 and RES2 is the same as the transverse axis of the respective metal pieces PM1 and PM2.

When there is no failure in the cabinet, all of the circuit breakers are in the on position and do not need to be reset. The reset mechanism RM must therefore be at a sufficient distance from the push buttons of the circuit breakers. In order to fulfill this distance condition (condition 1), the sum of the stiffness coefficients of the springs RES1 and RES2 must be greater than the sum of the stiffness coefficients of the set of springs integrated into the circuit breakers.

When at least one circuit breaker trips as a result of a failure that has occurred in a device in the cabinet, the circuit breaker is reset by actuating the push button BP that is located on the accessible side of the unit PDU. The reset can be performed manually by actuating the push button BP with one's finger. This actuation causes a transverse movement of the reset mechanism RM.

Figure 5A:
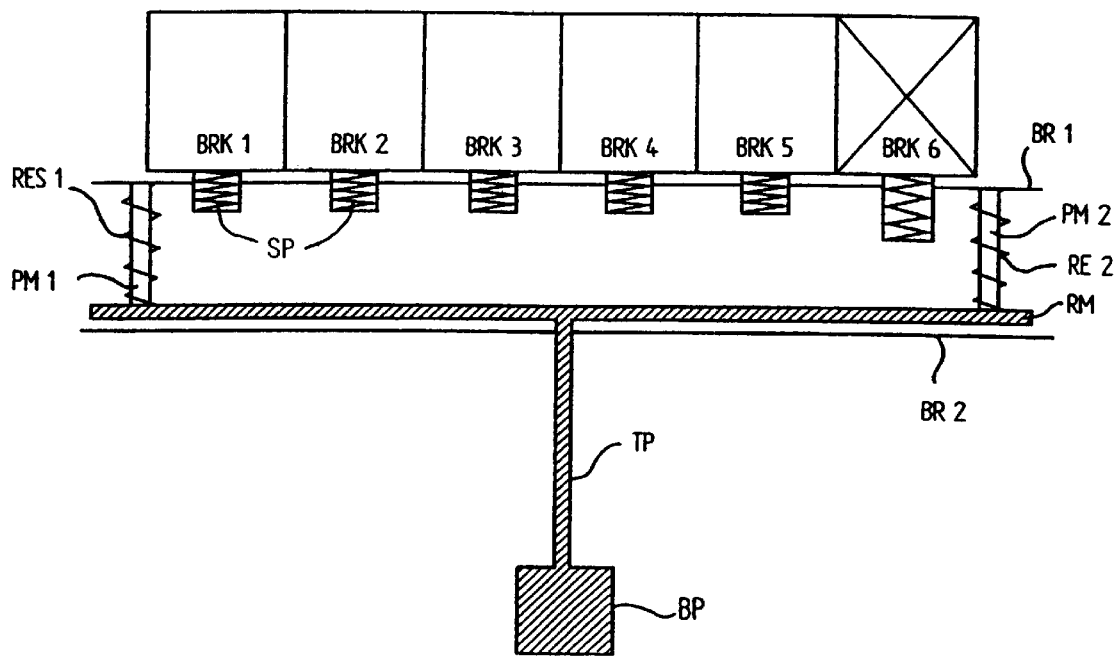
FIGS. 5A and 5B are rough top views of a variant of the operation of the reset mechanism shown in FIG. 2.
Figure 5B:
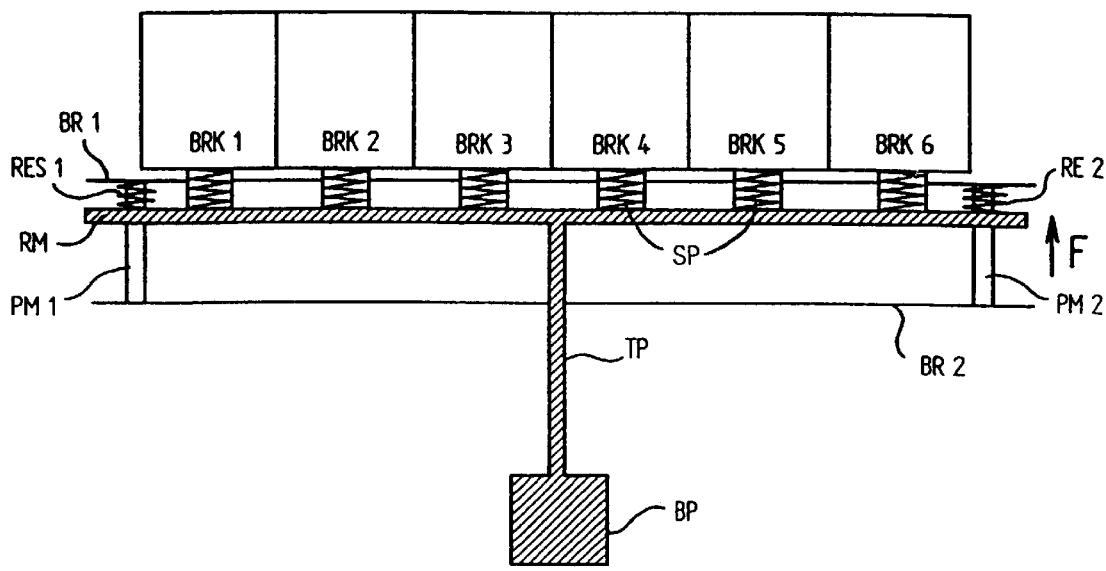

FIGS. 5A and 5B illustrate the progress of the movement of the reset mechanism RM between the two sides BR1 and BR2 of the fastening support.

FIG. 5A illustrates the state of the reset mechanism at the initial instant. This instant corresponds, for example, to a failure that has occurred in the device that is electrically protected by the circuit breaker BR6. In FIG. 5A, a cross in the circuit breaker BRK6 shows that it has tripped.

FIG. 5B illustrates the step that consists of resetting the circuit breaker BRK6. The reset consists of exerting pressure on the push button, for example using one's finger. The integral part constituted by the push button, the rod and the reset mechanism moves transversely between the two sides, from the side BR2 toward the side BR1. An arrow F in the figure indicates the direction of the movement of the reset mechanism. The two metal pieces PM1 and PM2 guide the reset mechanism RM in its transverse movement.

During the movement of the reset mechanism RM, the two springs RES1 and RES2 are progressively compressed until the reset mechanism RM is in contact with the push buttons. The reset mechanism RM resets the circuit breaker BR6 by compressing the springs integrated into the circuit breakers.

Naturally, in this exemplary embodiment, the length of the push pin TP is greater than the distance that separates the sides BR1 and BR2.

Of course, the invention is not limited to the exemplary embodiment of the reset mechanism that has been described above as an example. On the contrary, it encompasses all variants of embodiment and application that adhere to the same principle.

In particular, it would not be beyond the scope of the invention to modify the reset mechanism, which can be divided into several reset mechanisms RM and several associated push pins and push buttons. According to this variant, it is possible to define circuit breaker controls either individually or in smaller groups. This would increase the cost but would make it possible to adapt to specific applications.

It would not be beyond the scope of the invention to modify the shapes of the two mechanical parts described above. For example, the first mechanical part constituted by the U-shaped support could have a V-shaped base instead of being on a longitudinal axis. Consequently, the reset mechanism is also V-shaped. It is always possible to imagine other embodiments of the reset mechanism, since the parameter of the quantity of products to be produced can influence the choice of one embodiment rather than another. On the other hand, no matter what mechanism is chosen, the primary constraint is that the device must be completely mechanically reliable (no possible jamming), since the circuit breakers are safety elements.

It would also be possible, according to another variant, to replace the push pin TP and the push button BP with an electrical mechanism that can control the reset mechanism RM remotely. This electrical control could be located on the accessible side of the distribution unit.

Figure 6A:
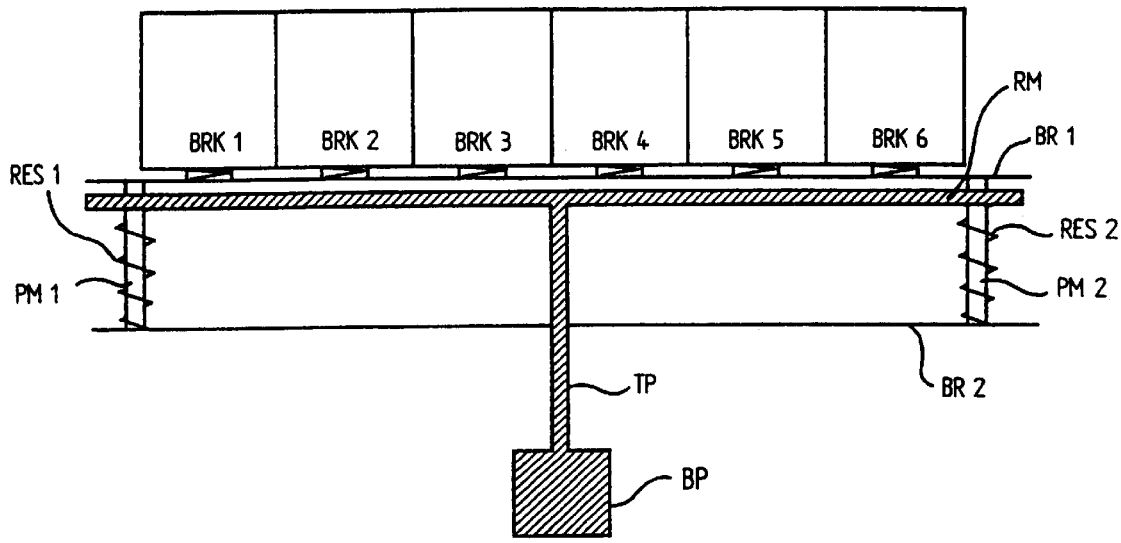
FIGS. 6A and 6B are rough top views of another variant of the operation of the reset mechanism shown in FIG. 2.
Figure 6B:
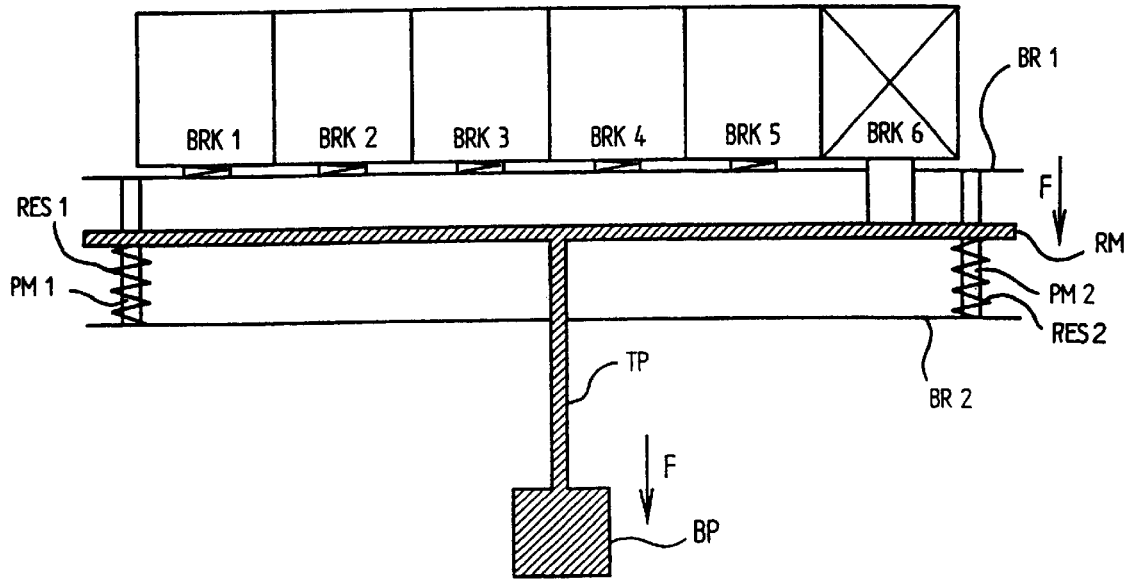

The choice of the reset mechanism also depends on the choice of the type of circuit breaker used. For example, the circuit breaker can comprise a push button that indicates through its state (in or out) whether a break has occurred (out) and allows reactivation it by pressing on the push button. The push button is extracted by means of a spring included in the push button of the circuit breaker when the latter is tripped (the failure is visible to the user). FIGS. 6A and 6B are rough top views of the operation of the reset mechanism that illustrate this variant.

In FIG. 6A, the reset mechanism RM is located near the push buttons. The function of the springs RES1 and RES2 is to keep the reset mechanism close to the push buttons POU1–POU6. If a circuit breaker trips, the push button associated with this circuit breaker is extracted, causing a displacement of the reset mechanism in its movement.

FIG. 6B illustrates the state of the reset mechanism after a circuit breaker has tripped. In this example, the circuit breaker BR6 has tripped. An arrow in the figure indicates the direction of the movement of the reset mechanism resulting from a failure. A fortiori, the integral parts of the reset mechanism RM, i.e., the push pin TP and the push button BP also move. The displacement of the push button BP being visible from the outside, the user in front of the cabinet is therefore informed that a failure has occurred in the cabinet.

Naturally, if a failure occurs in a device, the spring system integrated into the push button of the circuit breaker must be capable of exerting enough force to move the reset mechanism RM.

Naturally, another possible variant would be to have as many circuit breakers as there are outlets. This, however, would result in a substantial increase in the cost price without providing any obvious advantage. However, this would not have any impact on the originality of the invention, which is independent of the number of circuit breakers.

Figure 7A:
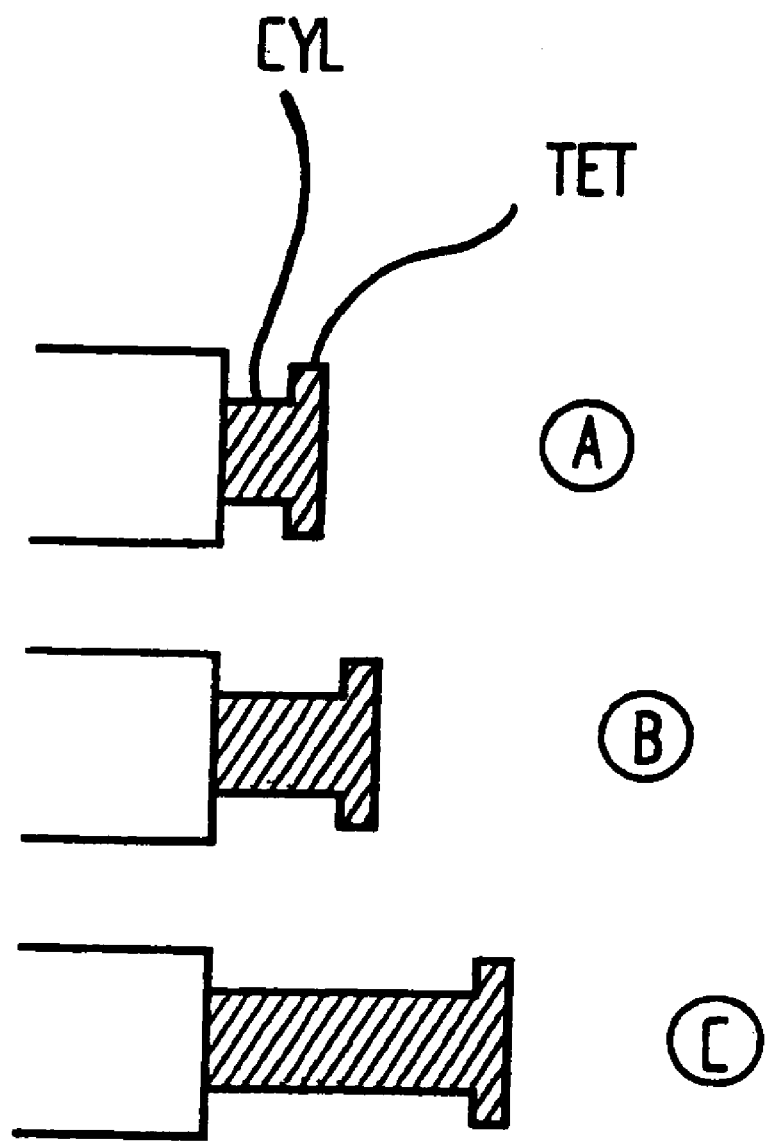
FIG. 7A is a view of various states of a circuit breaker comprising a circuit-breaking function.

Another possible exemplary embodiment of the invention would be to define the product with an additional circuit breaking function. In this case, the circuit breakers would be chosen with this function. FIG. 7A illustrates the various positions of a push button of such a circuit breaker. A circuit breaker of this type can have three states:

a first state characteristic of a normal state (the push button is in a depressed position A)

a second state characteristic of a failure state (the push button is in an intermediate position B)

and a third state characteristic of a circuit-break (the push button is in a position C), fully extracted. This extraction is performed manually.

In this example, the push buttons of the circuit breakers comprise a cylindrical part CYL, one end of which is inserted into the circuit breaker. The other end comprises a cylindrical head TET with a diameter larger than the diameter of the cylindrical part CYL. In this example, the mechanism is designed so as to be able to extract, by means of the push button BP, the push button of the circuit breakers to a fully extracted position. In this example, the mechanical part PART1 is identical to the preceding examples. Conversely, the reset mechanism RM comprises a base BAS2 and two sides BR3 and BR4. The assembly constituted by the base BAS2 and the two sides BR3 and BR4 constitute an integral assembly that can move inside the mechanical part PART1 in the same way as described above in FIGS. 6A and 6B. The side BR3 located facing the circuit breakers comprises openings (or notches) capable of receiving the cylindrical head of the push buttons of the set of circuit breakers. The push button can therefore be driven in its movement when the reset mechanism RM moves.

Figure 7B:
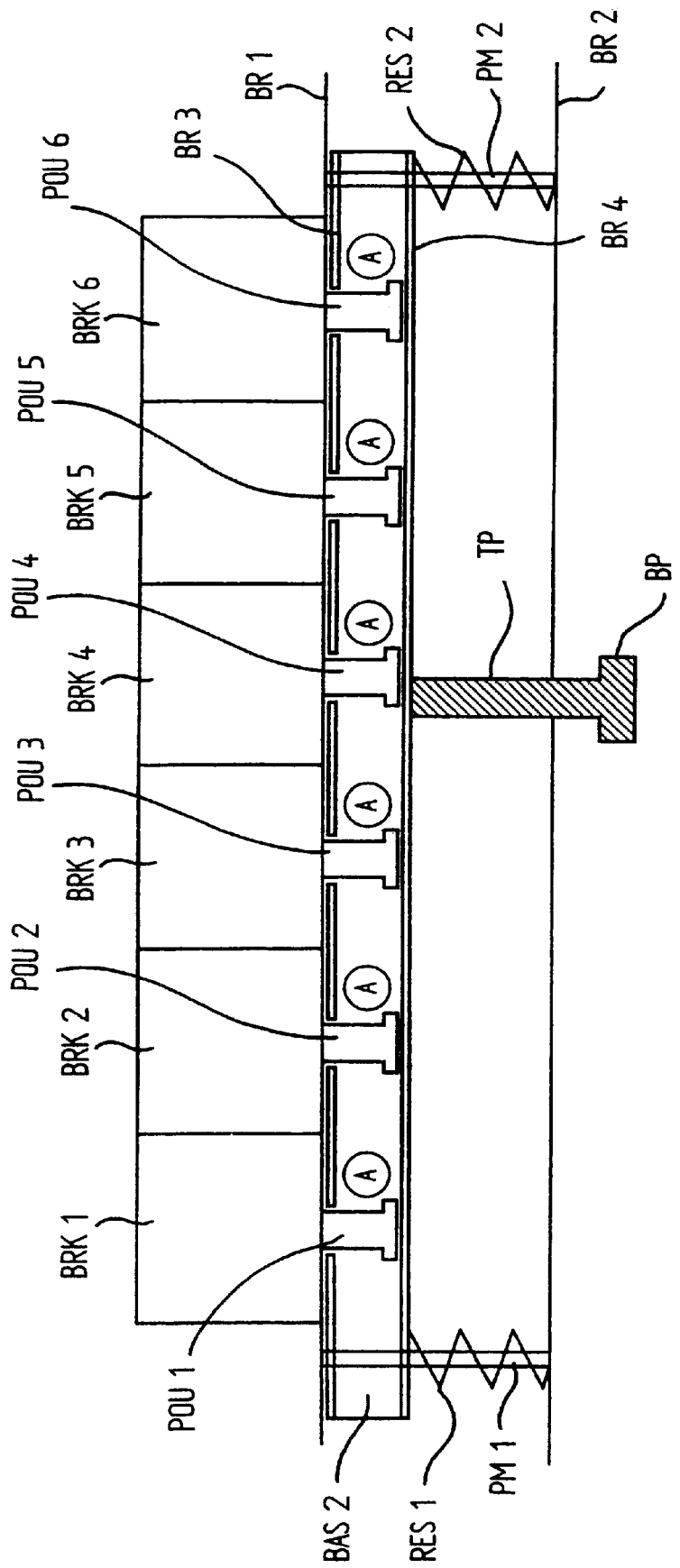
FIGS. 7B, 7C and 7D illustrate an exemplary embodiment of the reset mechanism as it performs this circuit-breaking function.
Figure 7C:
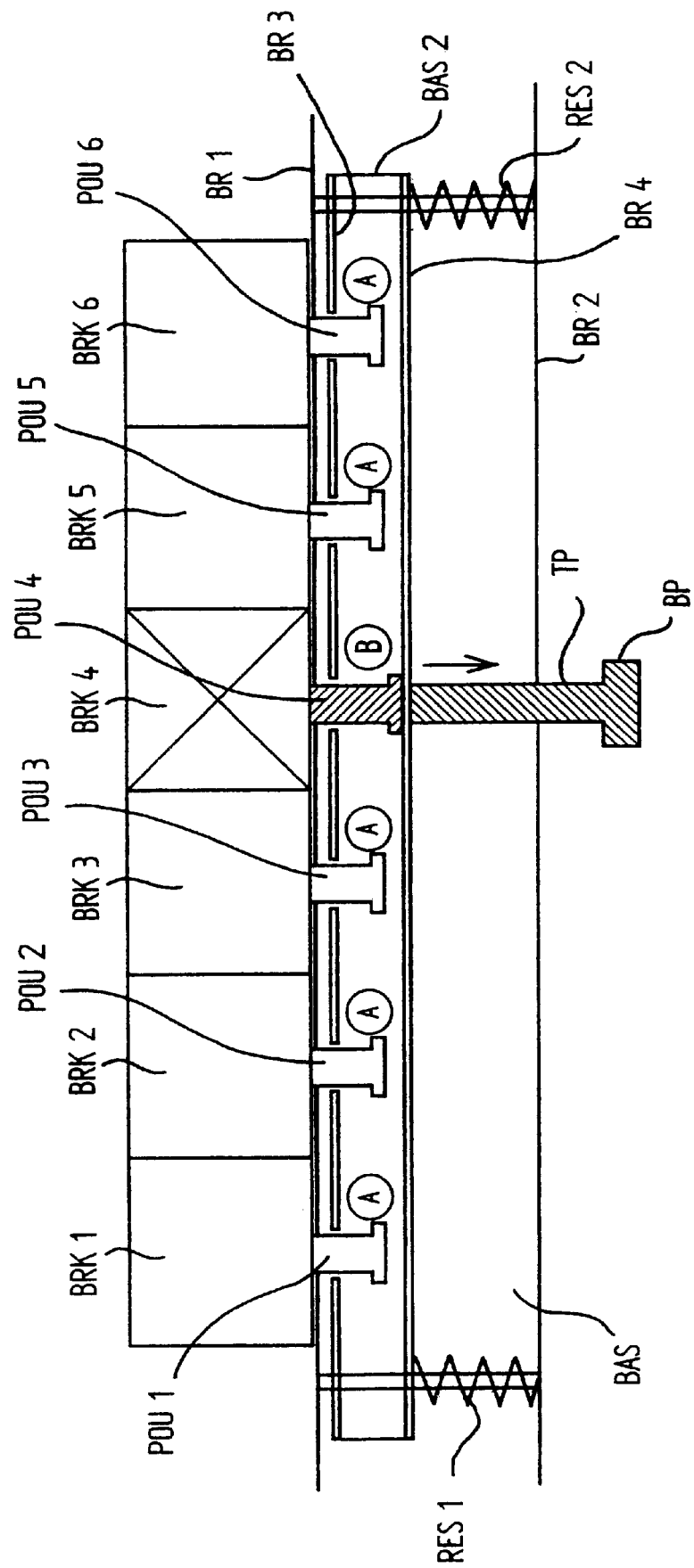
Figure 7D:
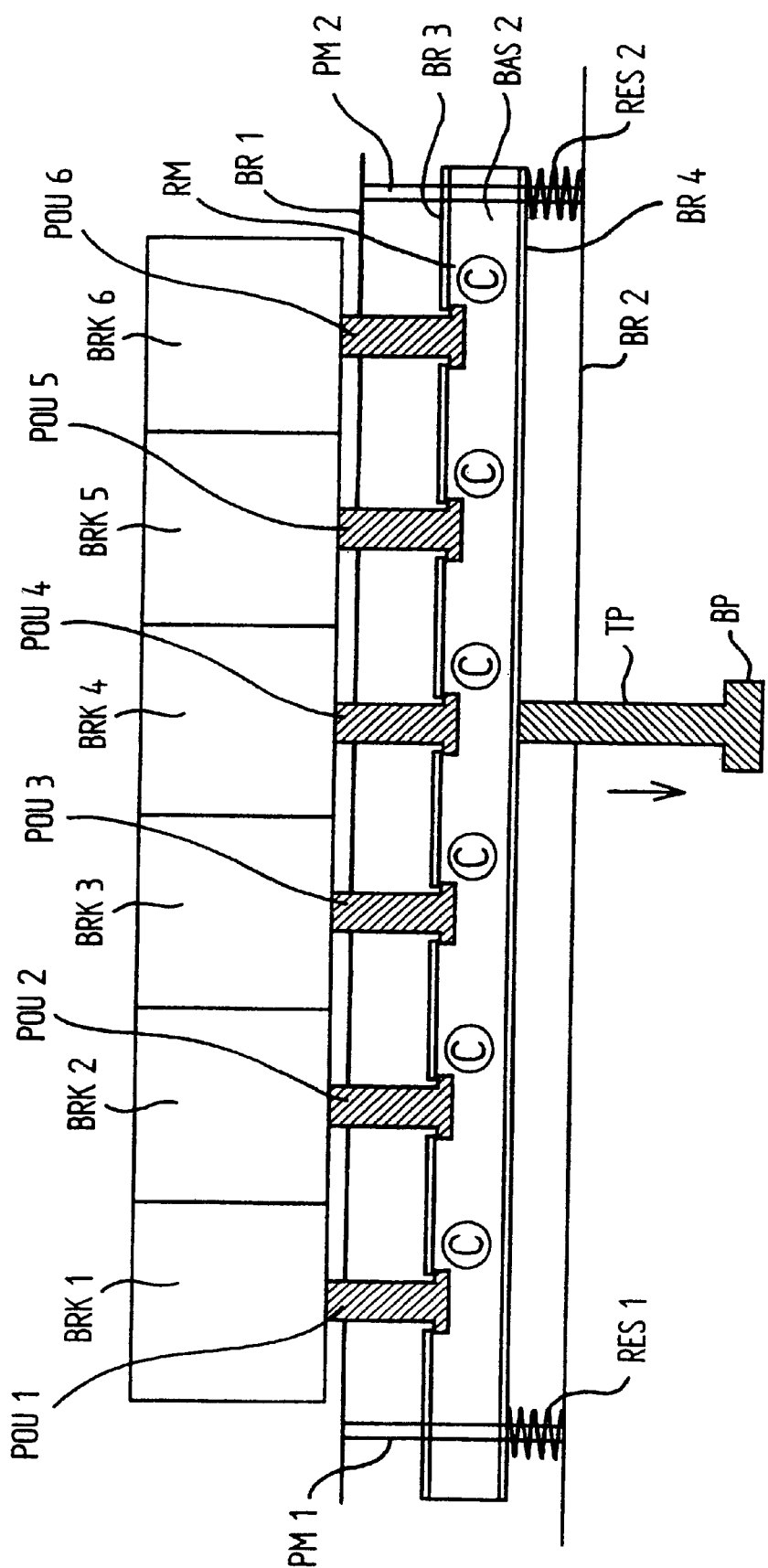

Let us refer to FIGS. 7B, 7C and 7D, which illustrate an exemplary embodiment of the reset mechanism that performs this circuit breaking function.

FIG. 7B illustrates the mechanism in the rest state. The circuit breakers are in the state A.

FIG. 7C illustrates the state of the reset mechanism that indicates that a failure has occurred in the cabinet. In the example illustrated, the circuit breaker BRK4 trips. All of the circuit breakers are in the state A, except the circuit breaker BRK4 which is in the state B. The push button POU4 of the circuit breaker BRK4 emerges from the circuit breaker and in its movement, drives the side BR4 of the reset mechanism RM. One condition for the proper functioning of such a mechanism is that the throw of the push button of the circuit breakers be at least equal to the distance that separates the two sides BR3 or BR4 or vice versa. Likewise, condition 1 mentioned above must also be fulfilled.

FIG. 7D illustrates the state of the mechanism after it has performed the circuit breaking function. In order to perform a circuit break, the user manually actuates the reset mechanism RM by means of the push button BP located outside the unit (an arrow in FIG. 7D shows the direction of the movement of the reset mechanism for performing a circuit break). The displacement of the push button BP and of the side BR3 drives the heads of the circuit breakers in its movement. All of the circuit breakers are in a state C. At this moment, the user can release the push button BP on the outside, and the springs RES1 and RES2 exert a return force such that the reset mechanism moves inside the mechanical part PART1 in the direction of the circuit breakers. Preferably, the return force is such that the side BR4 moves all the way to the heads of the circuit breakers, which are located in the fully extracted position (condition 1 must be fulfilled).

The invention has been described in connection with a power distribution unit for a 19-inch cabinet. It is understood that it can apply to other utilizations for distributing alternating-current or direct-current power supplies in cases where the space on the accessible side is limited.

The invention can also apply to any unit in which the protective circuit breakers are located away from an accessible side without having any associated distribution outlets (direct wiring)

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A power distribution unit (PDU) for supplying power to electrical devices (APP1–APP12), comprising a distribution point (P) for a power source, a plurality of female outlets (J1–J12) on an accessible side of the unit and each constructed to receive a respective male connector of an electrical device (APP1–APP12), said point (P) being electrically connected to a plurality of manually resettable circuit breakers (BRK1–BRK6) disposed inside the power distribution unit, each circuit breaker having at least a set and reset condition, having a respective push button (POU1–POU6) for resetting the circuit breaker to its set condition, having a respective spring (SP) for ejecting the push button (POU1–POU6) in case of electrical failure, and being electrically connected to at least one of the said female outlets (J1–J12), and a reset mechanism (RM) having a reset push button (BP) for resetting concurrently all of the circuit breakers whose push buttons (POU1–POU6) have been ejected.

2. A power distribution unit (PDU) according to claim 1, wherein said reset push button (BP) is located outside of the power distribution unit (PDU) for operating said reset mechanism remotely.

3. A power distribution unit (PDU) according to claim 2, wherein said reset push button (BP) is connected to the reset mechanism inside of said power distribution unit (PDU) by a push pin (TP) extending through an opening provided on the accessible side of the unit.

4. A power distribution unit (PDU) according to claim 1, further comprising at least one spring (RES1, RES2) for holding the reset mechanism (RM) apart from the push buttons (POU1–POU6) of said circuit breakers and being disposed to be compressed when the circuit breakers are reset.

5. A power distribution unit (PDU) according to claim 1, wherein the push buttons (POU1–POU6) ejected by their springs (SP) in case of electrical failure are disposed to drive the reset mechanism so that displacement of the reset push button (BP) on the accessible side of the unit indicates that an electrical failure has occurred.

6. A power distribution unit (PDU) according to claim 1, further comprising a cabinet housing said electrical devices and said power distribution unit, and wherein the reset push button (BP) is located outside of the cabinet and by its position indicates that an electrical failure has occurred.

7. A method for resetting a plurality of manually resettable circuit breakers (BRK1–BRK6) included in a power distribution unit (PDU), having a distribution point (P) for a power supply and a plurality of female outlets (J1–J12) on a side of said unit and each constructed to receive a respective male connector of an electrical device (APP1–APP12), said point (P) being electrically connected to said circuit breakers (BRK1–BRK6), each of the said circuit breakers having a respective push button (POU1–POU6) for resetting it, each push button having a spring (SP) for ejecting the push button (POU1–POU6) in case of electrical failure, each circuit breaker (BRK1–BRK6) being electrically connected to at least one of said female outlets (J1–J12), characterized in that the method comprises remotely concurrently resetting all of said circuit breakers whose push buttons have been ejected.

8. A method according to claim 7, wherein the remote resetting of said circuit breakers uses a pair of relatively moving parts, a first of which supports the circuit breakers in sequence along a predetermined axis in the unit (PDU) and a second of which moves relative to the first part in a direction transverse to said axis.

9. A method according to claim 8, wherein said second part has a surface that covers the push buttons of said circuit breakers and is moved by a push pin (TP) extending outside the unit (PDU).

10. A computer cabinet (ARM) comprising at least one power distribution unit (PDU) for supplying power to electrical devices (APP1–APP12) disposed in the cabinet, said power distribution unit comprising a distribution point (P) for a power supply and a plurality of female outlets (J1–J12) on a side of the cabinet and each constructed to receive a male connector of a respective electrical device (APP1–APP12), said female outlets (J1–J12) being electrically connected to a plurality of manually resettable circuit breakers (BRK1–BRK6) disposed inside the power distribution unit with a reset mechanism (RM) for resetting the plurality of circuit breakers (BRK1–BRK6) concurrently in response to a single reset push button (BP) accessible from outside of the cabinet (ARM), said point (P) being electrically connected to said circuit breakers (BRK1–BRK6), each of said circuit breakers having a respective push button (POU1–POU6) constructed to be moved by said reset mechanism, and having a spring (SP) for ejecting the push button (POU1–POU6) in case of electrical failure.

11. A computer cabinet according to claim 10, wherein said push button (BP) is located outside of the power distribution unit (PDU) for operating said reset mechanism remotely.

12. A computer cabinet according to claim 11, wherein said push button (BP) is connected to the reset mechanism inside of said power distribution unit (PDU) by a push pin (TP) extending through an opening in the cabinet.

13. A computer cabinet according to claim 10, further comprising at least one spring (RES1, RES2) for holding the reset mechanism (RM) apart from the push buttons (POU1–POU6) of said circuit breakers and being disposed to be compressed when the circuit breakers are reset.

14. A computer cabinet according to claim 10, wherein the push buttons (POU1–POU6) ejected by their springs (SP) in case of electrical failure are disposed to drive the reset mechanism so that displacement of the reset push button (BP) indicates that an electrical failure has occurred.

15. A power distribution unit (PDU) according to claim 5, wherein the reset push button (BP) is coupled to the push buttons (POU1–POU6) of said circuit breakers so as to permit the reset push button (BP) to move in a direction opposite to a direction in which said push buttons (POU1–POU6) are moved for resetting the circuit breakers (BRK1–BRK6) in order to break circuits connected to said circuit breakers (BRK1–BRK6) simultaneously.

* * * * *